United States Patent [19]

Mehan et al.

[11] 4,109,050

[45] Aug. 22, 1978

[54] COATED SILICON-BASED CERAMIC COMPOSITES AND METHOD FOR MAKING SAME

[75] Inventors: Richard L. Mehan, Scotia; Charles R. Morelock, Ballston Spa, both of N.Y.

[73] Assignee: General Electric Company, Schenectady, N.Y.

[21] Appl. No.: 748,930

[22] Filed: Dec. 9, 1976

[51] Int. Cl.² ............................................... B32B 9/04
[52] U.S. Cl. ................................. 428/332; 156/662; 427/309; 427/376 A; 428/446; 428/539; 428/334; 428/335; 428/336
[58] Field of Search .................. 427/309, 376 A, 275, 427/93; 428/334, 332, 446, 539; 156/662

[56] References Cited

U.S. PATENT DOCUMENTS

| | | | |
|---|---|---|---|
| 2,431,327 | 11/1947 | Geiger | 106/44 |
| 2,874,067 | 2/1959 | Sommer et al. | 428/446 |
| 3,398,033 | 8/1968 | Haya et al. | 156/662 |
| 3,459,842 | 8/1969 | Wakefield | 264/56 |
| 3,565,771 | 2/1971 | Gulla | 427/309 |
| 3,574,008 | 4/1971 | Rice | 427/93 |
| 3,575,746 | 4/1971 | Cheskis et al. | 428/446 |
| 3,969,168 | 7/1976 | Kuhn | 427/93 |
| 3,977,061 | 8/1976 | Lindstrom | 428/334 |
| 4,001,465 | 1/1977 | Graul et al. | 428/446 |

FOREIGN PATENT DOCUMENTS 100,430   6/1936   Australia ............................... 427/309

*Primary Examiner*—Ronald H. Smith
*Assistant Examiner*—Sadie L. Childs
*Attorney, Agent, or Firm*—William A. Teoli; Joseph T. Cohen; Charles T. Watts

[57] ABSTRACT

A method is provided for making silicon-based ceramic composites having reduced tendency to form complex silicides when in contact with high performance metals or metallic alloys at elevated temperatures. The surface of the silicon-based ceramic composite, such as silicon carbide-silicon matrix composite, is etched, treated with an inorganic oxide mixture and fired. Improved performance is provided when the resulting composite is used in a specific application in contact with a high performance metal or metallic alloy, such as a gas turbine bucket.

7 Claims, No Drawings

COATED SILICON-BASED CERAMIC COMPOSITES AND METHOD FOR MAKING SAME

The present invention relates to silicon-based ceramic composites exhibiting a reduced tendency to form metallic silicides when used in contact with a metallic surface at an elevated temperature.

Prior to the present invention, as shown by R. L. Mehan and D. W. McKee, Interaction of Metals and Alloys with Silicon-Based Ceramics, Journal of Materials Science II (1976) 1009–1018, silicon based ceramics have been found to chemically interact with a number of metals and alloys at temperatures in the vicinity of 1000° C in air. Included among the reaction products are silicides, silicates and carbides. The significance of the finding of Mehan et al is that when a silicon-based ceramic, for example, a silicon carbide-silicon matrix composite, such as taught in copending application of Laskow and Morelock, Ser. No. 572,969, filed Apr. 30, 1975 and assigned to the same assignee as the present invention, when used in the form of a turbine bucket or aircraft engine blade, may interfere with the performance of the gas turbine or aircraft engine based on the formation of the metallic silicides when the silicon based ceramic comes in contact with a high performance metal or metallic alloy at elevated temperatures. It would be desirable, therefore, to reduce the tendency of such silicon-based ceramic to interact with metallic surfaces at elevated temperatures.

The present invention is based on the discovery that silicon-based ceramic exhibiting a reduced tendency to interact with metallic surfaces at elevated temperatures can be made, if the surface of the silicon-based ceramic is etched to remove surface silicon to a depth of at least about 0.001 inch, and thereafter the cavity of the etched ceramic is filled with an inorganic oxide mixture, such as an aluminum oxide-silicon oxide blend, which is fired to produce a surface ceramic substantially replacing the silicon removed from the ceramic during the etching step.

There is provided by the present invention, a method of reducing the tendency of a silicon-based ceramic from forming reaction products, such as silicides, when in contact with a metallic surface at elevated temperatures which comprises
(1) etching the surface of the silicon-based ceramic to effect the removal of surface silicon,
(2) substantially filling the cavity resulting from the removal of silicon-based ceramic from the surface of the silicon composite of step (1) with an inorganic oxide mixture and
(3) firing the treated silicon-based ceramic of (2) to a temperature of up to 1250° C resulting in the conversion of the inorganic oxide mixture to an adherent ceramic coating.

Included by the silicon-based ceramic which can be treated in accordance with the practice of the method of the present invention are, for example, silicon carbide-silicon matrix composites shown in copending application of Laskow and Morelock Ser. No. 572,969, filed Apr. 30, 1975, Hillig and Morelock Ser. No. 660,261, filed Feb. 23, 1976, both assigned to the same assignee as the present invention. Additional silicon-based ceramic composites which can be treated in accordance with the present invention are, for example, silicon carbide composites as shown by Wakefield, U.S. Pat. No. 3,459,842, Geiger, U.S. Pat. No. 2,431,327, etc.

Included by the inorganic oxide blends which can be used to treat the etched surface of the silicon-based ceramic composites of the present invention are, for example, blends of aluminum oxide and silicon oxide, such as Kyanite, Ball Clay, Kaolin, etc. The inorganic oxide blend can be used as a paste when blended with $AL(H_2PO_4)_3$, $H_2O$, etc. Etching solutions which can be used are, for example, mixtures of hydrofluoric and nitric acid.

In the practice of the invention the silicon-based ceramic is treated with an etchant to effect the removal of at least 0.001 inch to 0.010 inch of surface silicon from the silicon-based ceramic. After the etchant has been rinsed from the surface of the silicon-based ceramic, it can be treated with an inorganic oxide mixture and the resulting silicon-based ceramic is fired to convert the inorganic oxide to an adherent ceramic coating.

The silicon-based ceramic can be etched by various standard techniques, such as immersion, swabbing, spraying, etc., with a suitable etchant as previously defined. Depending upon the nature of the etchant and the depth to which the surface silicon is to be removed from the silicon-based ceramic, the time for treating the silicon-based ceramic with the etchant can vary widely, such as a few minutes or less to several hours or more. After sufficient silicon has been removed from the surface of the silicon-based ceramic, the etchant can be rinsed therefrom.

The silicon-based ceramic is then treated with the inorganic oxide mixture which can be applied with an applicator in the form of a paste, or it can be sprayed, painted, etc. Depending upon the specification desired in the silicon-based ceramic, excess inorganic oxide mixture can be removed by standard techniques, such as brushing, etc., until the desired surface thickness is achieved. The silicon-based ceramic can then be fired at a temperature of from 1250° C to 1400° C to convert the surface inorganic oxide to an adherent enamel or smooth coating which substantially resembles the original silicon-based ceramic prior to etching. However, after firing, the color of the surface of the silicon-based ceramic can vary widely, based upon the compositions of the inorganic oxide mixture employed.

The silicon-based ceramic composites, and preferably the silicon carbide-silicon matrix composites which can be treated in accordance with the practice of the present invention can be used in a variety of applications, such as turbine buckets, aircraft engine blades, abradable coatings in the form of rotary sealants, etc.

In order that those skilled in the art will be better able to practice the invention, the following example is given by way of illustration and not by way of limitation. All parts are by weight.

EXAMPLE 1

A carbon fiber preform was prepared from low modulus WCA carbon cloth of Union Carbide Corporation using an aqueous colloidal suspension of graphite as a binder. The density of the fiber was approximately 1.38–1.48 grams/cc and the total weight of fiber in the preform after it was machined to a 2.5 inches diameter disk was about 11 grams.

A 3 inch diameter mold was machined out of Speer 580 graphite having a mold cavity of about 2.5 inches and a 0.42 inch thickness. Four 0.125 diameter infiltration holes were drilled into the top half of the mold and 0.125 inch diameter vent holes were drilled into the bottom half of the mold. Carbon fiber wicks in the form of WYK braid were inserted into the infiltration holes and protruded about 0.125 inches from the top of the mold. The inside surface of the mold was treated with a boron nitride powder in a form of an aerosol spray.

The carbon fiber preform was then placed in the mold, and the mold was then placed in a supporting structure made from Armco Speer 580 graphite which had been precision machined to the specifications of the mold. A charge of powder silicon was then poured on top of the mold surface. In estimating the amount of silicon, there was employed up to about a 15% excess of that amount of silicon required to fill the mold cavity in the molten state.

The mold and supporting structure was then placed in a furnace which was maintained under a vacuum of about $1 \times 10^{-2}$ torr. A pressure of from $1 \times 10^{-2}$ torr to 3 torr also was operable. The furnace was maintained at a temperature of about 1600° C. It was found that the silicon powder converted to molten silicon in about 15 minutes and it was allowed to infiltrate the carbon fiber prepreg. After cooling to room temperature, the mold and supporting structure was removed from the furnace and allowed to cool under atmospheric conditions. The mold was then opened and there was obtained a disk which conformed within 0.2% of the dimensions of the mold cavity. Based on method or preparation, the disk was a silicon carbide, silicon ceramic having about 16% by weight carbon in the chemically combined form, or as a mixture of chemically combined carbon and elemental carbon and about 84% by weight of silicon.

The above silicon carbide-silicon matrix composite disk is placed in a crucible on a flat piece of Haynes 718, a nickle-base alloy. The silicon composite disk and metal strip is then placed in an oven and heated to 1150° C under atmospheric conditions. After 150 hours the silicon ceramic disk and the metal strip are removed from the oven and allowed to cool to room temperature. The surface of the metal strip is then carfully examined under an optical microscope. It is noted that a siliciding reaction has taken place on the surface of the metal strip, based on the appearance of a rough looking surface and a series of craters indicating silicon-metal reaction. Those skilled in the art would know that, in the event a silicon carbide-silicon matrix composite were used as part of a power generating apparatus, such as an aircraft engine blade, and such ceramic part was in continuous contact with a high performance metal, such as a chromium and nickel containing alloy, the surface of such metal part could be adversely affected, eventually resulting in breakdown of the structure.

Another silicon carbide-silicon matrix composite disk was made following the procedure above which was swabbed with an etchant in the form of a mixture of hydrofluoric acid and nitric acid. After the etchant had been allowed to contact the silicon-based ceramic disk for 15 seconds, the treated ceramic disk was washed with water to remove the etchant. Upon examining the etchant surface of the ceramic disk it was found that the etchant had removed on the average of about 0.004 inch of silicon from the surface. A paste consisting of Mullite, a blend of aluminum oxide and silicon oxide and aluminum hypophosphate was uniformally applied onto the etched surface of the silicon ceramic disk employing a spatula. The thickness of the applied paste was approximately equivalent to the depth of the cavity resulting from the action of the etchant. The treated ceramic disk was then placed in an oven and heated for 15 hours at 1250° C under atmospheric conditions. The ceramic disk was then allowed to cool. It was found that the inorganic oxide paste had been converted to a uniform glaze over the surface of the silicon ceramic disk.

The procedure was repeated with respect to placing the silicon carbide-silicon matrix composite disk on top of a metal nickel-chromium alloy strip, except that the ceramic was placed on the metal strip so that the surface of the inorganic coating which had been fired on the surface of the silicon ceramic contacted the metal alloy strip. After the silicon ceramic had been heated in contact with the metal strip for the same period of time and under the same conditions, it was allowed to cool. An examination of the metal strip shows it is free of any surface reaction with the silicon ceramic disk. This indicates that the treatment of the silicon-based ceramic disk with the fired inorganic oxide coating reduces the tendency of the silicon-ceramic disk to react with the Haynes 715 alloy at temperatures of 1000° C or above after 150 hours.

Although the above example is directed to only a few of the very many variables which can be used in the practice of the method of the present invention, it should be understood that the present invention is directed to the use of a much broader class of silicon-based ceramic composites, inorganic oxide mixtures, etc., which are shown in the description preceding this example.

What we claim as new and desire to secure by Letters Patent of the U.S. is:

1. A method of reducing the tendency of a silicon-based ceramic, selected from the class consisting of a silicon carbide containing ceramic, and a silicon nitride containing ceramic, from reacting with a metallic surface at elevated temperatures to form metallic silicides which comprises
    (1) etching the surface of the silicon-based ceramic composite to effect the removal of surface silicon,
    (2) substantially filling the cavity of the resulting etched silicon-based ceramic composite formed during step (1) with an inorganic oxide mixture comprising a blend of aluminum oxide and silicon oxide and
    (3) firing the treated silicon-based ceramic of (2) to a temperature of up to 1250° C resulting in the conversion of the inorganic oxide mixture to an adherent ceramic coating.

2. A method in accordance with claim 1, where the silicon-based ceramic composite is a silicon carbide-silicon matrix composite.

3. A method in accordance with claim 1, where the etchant is a mixture of hydrofluoric acid and nitric acid.

4. A shaped silicon-ceramic base composite selected from the class consisting of silicon carbide and silicon nitride having a reduced tendency to react with a metallic surface at elevated temperatures to form silicides which has an adherent inorganic oxide ceramic coating with a thickness of about 0.001 to 0.010 inch comprising the product obtained by firing a blend of aluminum oxide and silicon oxide at a temperature of up to 1250° C.

5. A shaped composite in accordance with claim 4 in the form of a gas turbine shroud section.

6. A shaped composite in accordance with claim 4, in the form of an aircraft engine shroud section.

7. A shaped composite in accordance with claim 4, in the form of a gas turbine transition piece.

* * * * *